United States Patent
Matsui

[19]

[11] Patent Number: 5,982,050
[45] Date of Patent: Nov. 9, 1999

[54] POWER SUPPLY UNIT FOR AUTOMOTIVE VEHICLE

[75] Inventor: Fujio Matsui, Sagamihara, Japan

[73] Assignee: Fuji Jukogyo Kabushiki Kaisha, Tokyo, Japan

[21] Appl. No.: 08/820,386

[22] Filed: Mar. 12, 1997

[30] Foreign Application Priority Data

Mar. 14, 1996 [JP] Japan ................................ 8-58065

[51] Int. Cl.⁶ .................................................. H02J 7/24
[52] U.S. Cl. ..................... 307/10.7; 320/104; 320/107; 320/116; 340/455; 340/636
[58] Field of Search .................... 307/10.7, 10.1; 320/104, 107, 116; 322/28, 99; 324/771; 340/636, 691, 455

[56] References Cited

U.S. PATENT DOCUMENTS

| 4,019,120 | 4/1977 | Fattic ................................. 322/28 |
| 4,146,825 | 3/1979 | Harhay .............................. 320/107 |
| 4,316,134 | 2/1982 | Balan et al. ....................... 340/455 |
| 4,839,576 | 6/1989 | Kaneyuki et al. ................. 322/28 |
| 5,039,931 | 8/1991 | Wieland ............................ 320/104 |

*Primary Examiner*—Albert W. Paladini
*Attorney, Agent, or Firm*—Smith, Gambrell & Russell, LLP

[57] ABSTRACT

A Zener diode 16 is connected to each of single cells 10 of an electric double layer capacitor in parallel, and a resistor 18 is connected to each of the Zener diode 16 in series. Thus, in a case where a single cell 10 is excessively charged, when the bias voltage of the single cell 10 is equal to or higher than the Zener voltage, a discharge current flows through the Zener diode 16 connected to the single cell 10, so that the voltage decreases to the Zener voltage. Thus, it is possible to prevent the electric double layer capacitor from being excessively charged due to the dispersions in electrostatic capacity and internal resistance, and to stably accumulate electricity for a long time.

13 Claims, 6 Drawing Sheets

POWER SUPPLY UNIT FOR AUTOMOTIVE VEHICLE

BACKGROUND OF THE INVENTION

The present invention relates generally to a power supply unit for automotive vehicles. More specifically, the invention relates to a power supply for feeding electric current to various electrical loads of an automotive vehicle.

Figure 1:
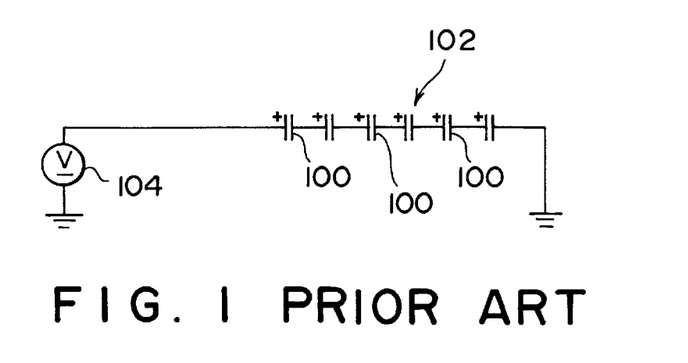
FIG. 1 is a schematic circuit diagram illustrating a main part of a conventional power supply unit using electric double layer capacitors for an automotive vehicle.

In recent years, it has been proposed to use an electric double layer capacitor, the capacity of which is remarkably increased using an electric double layer structure of electrons produced on the interface between electrodes and an electrolyte, as a cell. This electric double layer capacitor generates a voltage of, e.g., about 2.5 V, as a single cell. Therefore, in a case where this electric double layer capacitor is used for a power supply unit for an automotive vehicle, a plurality of single cells 100 are connected in series to be used as a capacitor pack as shown in FIG. 1.

That is, each of the single cells 100 is formed as an electric double layer capacitor which comprises a pair of current collecting bodies, each having an active carbon electrode, an electrolyte charged between the current collecting bodies, and a separator for separating the active carbon electrodes of the respective current collecting bodies from each other (all the elements are not shown). These single cells 100 are connected in series to form a capacitor pack 102. The capacitor pack 102 is connected to an on-vehicle generator 104 mounted on the vehicle. The on-vehicle generator 104 generates a voltage according to engine rotation, and the generated voltage is converted into a DC voltage by means of a rectifier to be output. Specifically, an alternator corresponds to the on-vehicle generator 104.

During the engine is operated, each of the single cells 100 is charged by the DC voltage from the on-vehicle generator 104, and the stored energy is discharged and used to drive a starter motor when the engine is restarted, and so forth.

The electromotive force of each of the single cells 100 is determined by the active voltage of the electrolyte. When a bias voltage, i.e., a charging voltage from the on-vehicle generator 104, exceeds the active voltage, the life time of the single cell 100 of electric double layer capacitor is rapidly decreased. In view of a margin of the safety, if the rated voltage of each of the single cells 100 is set to be lower than the active voltage of the electrolyte and if the single cells 100 are used at a voltage equal to or less than the rated voltage, it is possible to ensure a long life time which is one of the characteristics of the electric double layer capacitor.

However, the dispersions in electrostatic capacity and internal resistance of the single cells 100 may occur. Therefore, if the single cells 100 are charged from the on-vehicle generator 104 while being connected in series, the difference between the bias voltages may occur due to the dispersions in electrostatic capacity and internal resistance. That is, in a case where the single cells 100 are connected in series to be charged, if the electrostatic capacities and the values of internal resistance of the respective single cells are the same, the terminal-to-terminal voltages (the bias voltages) of the respective single cells are also the same. However, if there are the dispersions in electrostatic capacity and internal resistance, the imbalance in bias voltage occurs between the respective single cells. In addition, this difference in bias voltage may be integrated and increased when charge and discharge are repeatedly carried out.

Therefore, if the rated voltage is set in view of a margin of safety, a higher bias voltage than the rated voltage may be impressed on one of the single cells 100 due to the dispersion in characteristics of the respective single cells 100, which may cause a decrease in the life time.

Figure 2:
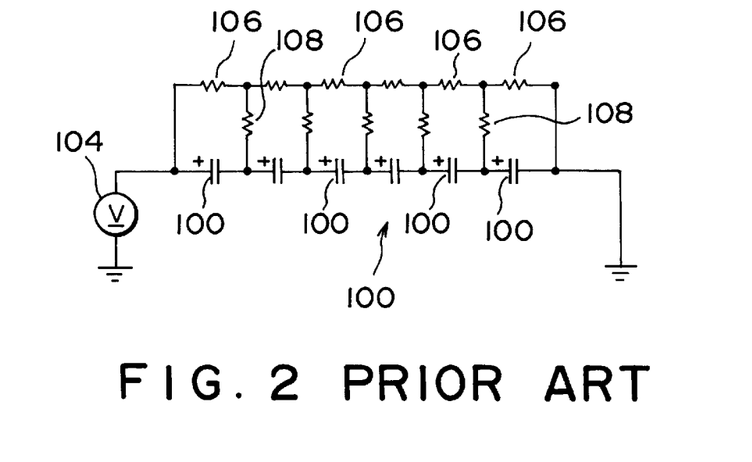
FIG. 2 is a schematic circuit diagram illustrating a conventional balance circuit system.

In order to overcome such a problem, a "balance circuit system" has been adopted. As shown in FIG. 2, this system is designed to balance the bias voltages of the respective single cells 100 by connecting balance resistors 106 having the same resistance to the respective single cells 100 via resistors 108 in parallel for every single cell 100 and by connecting the respective balance resistors 106 in series.

In addition, Japanese Utility Model Laid-Open No. 5-23527 discloses another conventional system wherein a balance resistor is electrically separated from a single cell when no charge is carried out, and the single cell and the balance resistor are connected in parallel when the terminal-to-terminal voltage of the single cell is higher than a predetermined value.

In the aforementioned conventional balance circuit system wherein the balance resistors 106 are connected to the respective single cells 100 in parallel, it is possible to equalize the bias voltages applied to the respective single cells 100, since the divided voltages are the same if the values of resistance of the respective balance resistors 106 are the same.

However, in the case of the balance circuit system, since the balance resistors 106 are always connected to the respective single cells 100 so that the whole electric circuit forms a closed loop, the electric energies stored in the respective single cells 100 are gradually lost as the discharge is carried out. Therefore, this system can not function as a "battery" since the discharge of each of the single cells 100 are started after the charge is stopped, so that this system can not be practically used as a power supply unit for driving, e.g., a starter motor, which is used when the engine is restarted, of an automotive vehicle.

In order to overcome this problem, in the aforementioned system disclosed in Japanese Utility Model Laid-Open No. 5-23527, the balance resistors are selectively connected to the single cells in parallel and separated therefrom by means of transistors and so forth. According to this system, it is possible to prevent the discharge to store the electric energy for a long time, since the balance resistors are separated from the single cells when no charge is carried out. However, according to this system, there are other problems in that the circuit structure is not only complicated due to the additional switch circuit to increase the manufacturing costs, but the reliability is also decreased due to the increase of the number of parts.

The aforementioned problems on the balance circuit system also appear in a lead battery pack used for a power supply unit of an electric vehicle. This lead battery pack is made by connecting a plurality of single cells like the capacitor pack shown in FIGS. 1 and 2.

SUMMARY OF THE INVENTION

It is therefore an object of the present invention to eliminate the aforementioned problems and to provide a power supply unit using cells of electric double layer capacitors or lead battery for an automotive vehicle, which can balance the bias voltages of the cells with a simple structure and which can control the discharge even if no charge is carried out.

In order to accomplish the aforementioned and other objects, according to one aspect of the present invention, a power supply unit for an automotive vehicle, comprises: a battery cell connected to an on-vehicle generator; a Zener diode connected to the battery cell in parallel in a direction that a reverse bias voltage is impressed thereon; and a resistor connected to the Zener diode in series. Thus, in a case where the bias voltage of the battery cell is equal to or higher than the Zener voltage, the discharge of the cell is permitted and a current defined by the resistance value of the resistor flows through the Zener diode, so that the bias voltage of the battery cell decreases to the Zener voltage. On the other hand, in a case where the bias voltage of the battery cell is less than the Zener voltage, the discharge is not permitted, so that the electric energy is conserved except for a slight self-discharge. Therefore, even if there are dispersions in electrostatic capacity and internal resistance, it is possible to maintain the bias voltage of the battery cell at a constant value to prevent the life time thereof from decreasing.

Another diode may be added to the Zener diode. In this case, it is possible to carry out the fine adjustment of the threshold for permitting the discharge.

In place of the Zener voltage, the forward threshold voltage of the diode may be utilized. In this case, the discharge is not permitted at a voltage less than the forward threshold voltage, and the discharge is carried out at a voltage equal to or higher than the forward threshold voltage. Therefore, it is possible to balance the bias voltages while preventing useless discharge.

The diode may be a light emitting diode. In this case, since the light emitting diode for adjusting the bias voltage by discharge emits light, it is possible to easily visually recognize the charged state of the electric double layer capacitor from the outside.

As mentioned above, a power supply unit using a battery cell for an automotive vehicle, according to the present invention, is designed to permit the discharge from the battery cell when the bias voltage of the battery cell is equal to or higher than the Zener diode, and to stop the discharge when the bias voltage of the battery cell decreases to the Zener diode. Therefore, it is possible to effectively prevent the excessive charge of the battery cell and to prevent useless discharge to maintain the battery function for a long time, so that it is possible to improve the practicability.

In addition, when the light emitting diode is utilized, it is possible to confirm the charged state of the battery cell, wherein the bias voltage is adjusted, without the need of any measuring instruments, so that it is possible to improve the maintenance. Moreover, when the unit is formed so that the battery cell is charged at a charging voltage which is not greater than the rated voltage of the battery cell and which is equal to or greater than the Zener voltage, it is possible to more suitably adjust the balance of the voltages of the battery cells when the engine is operated.

DESCRIPTION OF THE PREFERRED EMBODIMENT

Referring now to the accompanying drawings, particularly to FIGS. 3 through 12, the preferred embodiments of the present invention will be described in detail below.

Figure 3:
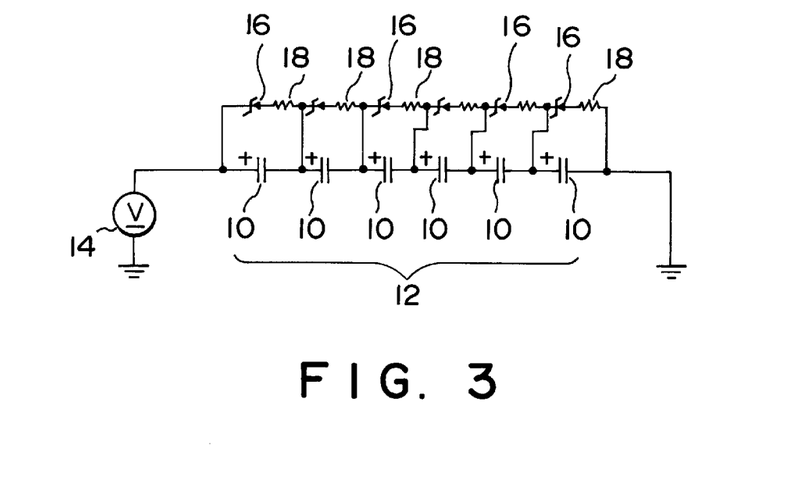
FIG. 3 is a schematic circuit diagram illustrating a main part of the first preferred embodiment of a power supply unit using electric double layer capacitors for an automotive vehicle according to the present invention.

FIG. 3 shows a circuit of the first preferred embodiment of a power supply unit using electric double layer capacitors for an automotive vehicle according to the present invention.

Each of single cells 10 of an electric double layer capacitor comprises, e.g., a pair of current collecting bodies, each having an active carbon electrode on the surface thereof, an electrolyte charged between the current collecting bodies, a separator provided between the active carbon electrodes so as to separate the electrodes from each other, and a gasket for preventing the leakage of the electrolyte (all the elements are not shown). These single cells 10 are designed to be connected in series to form a capacitor pack 12 which generates a desired electromotive force.

The positive side of the capacitor pack 12, thus formed by connecting the single cells 10 in series, is connected to an on-vehicle generator 14, and the negative side thereof is grounded. The on-vehicle generator 14 outputs a DC voltage rectified by a rectifier, and generates a voltage according to engine rotation.

A Zener diode 16 for limiting a bias voltage is connected to each of the single cells 10 in parallel. A resistor 18 is connected to each of the Zener diodes 16 in series for each of the single cells 10. The circuits, each comprising the single cell 10, the Zener diode 16 and the resistor 18, are connected in series.

Figure 4:
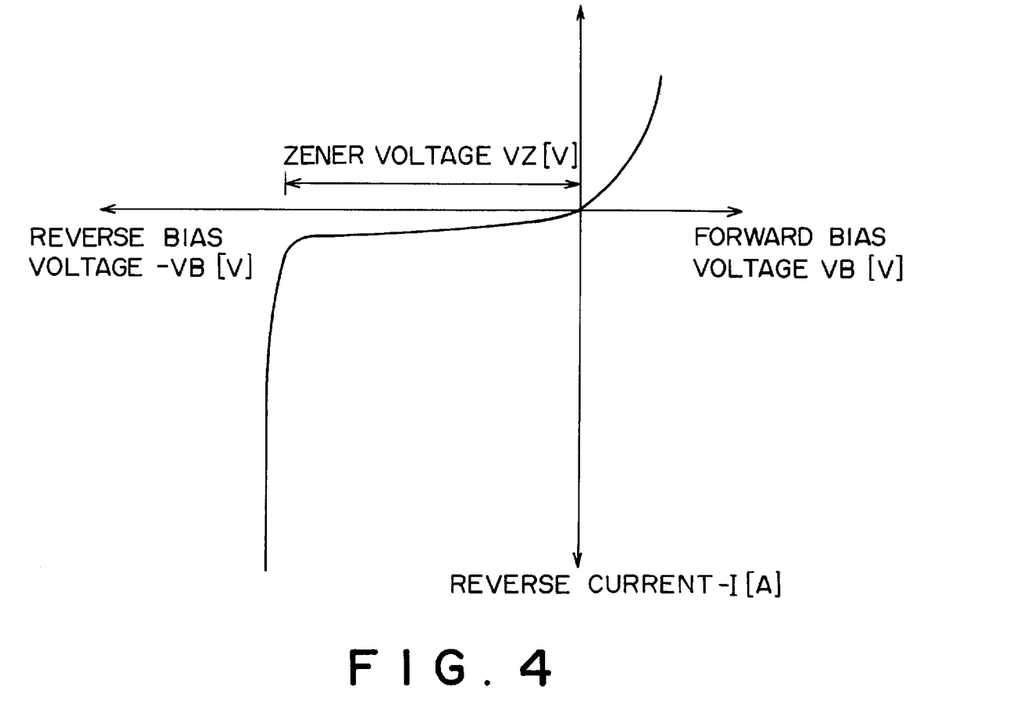
FIG. 4 is a graph explaining the electrical characteristic of a Zener diode.

The cathode terminal of each of the Zener diodes 16 is designed to be connected to the corresponding single cell 10. As shown in FIG. 4, the Zener diode 16 is an active element which allows current to flow from the cathode side to the anode side when a reverse bias voltage −VB greater than a predetermined Zener voltage VZ is impressed. Therefore, the Zener diode 16 allows current supply only when a reverse bias voltage −VB greater than the Zener voltage VZ is impressed.

In addition, each of the Zener diodes 16 is preferably set so that the Zener voltage VZ is equal to or slightly less than the rated voltage of the single cell 10. In a case where the Zener diode VZ is less than the rated voltage of the single cell 10, the difference between the rated voltage and the Zener voltage VZ is a margin for the safety. Moreover, Zener diodes having a small rated power, e.g., a rated power of about 1 W, are selected as the Zener diodes 16. Furthermore, in FIG. 4, while a negative sign is applied to the reverse bias voltage VB to distinguish the reverse bias voltage from the forward bias voltage VB, the sign "VB" will be hereinafter applied to the reverse bias voltage.

Each of the resistors 18 is designed to limit the value of discharge current I passing through the corresponding Zener diode 16 when the bias voltage VB of the corresponding single cells 10 exceeds the Zener voltage VZ. In accordance with the capacity of the Zener diode 16, the resistance of each of the resistors 18 is preferably set so that the discharge current is as small as possible.

With this construction, the operation of this preferred embodiment will be described below.

When the engine is started, the on-vehicle generator 14 outputs a predetermined discharging voltage. The bias voltages VB impressed on the respective single cells 10 are different from each other due to the dispersions in electrostatic capacity and internal resistance.

For example, when only the bias voltage VB of a particular single cell 10 increases to exceed the Zener diode voltage VZ, the Zener diode 16 connected to the single cell 10 in parallel allows current to pass therethrough, so that a predetermined discharge current I limited by the resistor 18 flows. Then, since the bias voltage VB decreases by this discharge current I, an excessive bias voltage VB of the single cell 10 is coincident with the Zener voltage VZ, so that the discharge is stopped.

On the other hand, in a single cell 10 wherein the bias voltage VB is less than the Zener voltage VZ, the Zener diode connected to the single cell 10 in parallel is not actuated, so that the discharge current I does not flow. With this construction, this preferred embodiment has the following advantageous effects.

First, each of the Zener diodes 16 is connected to the corresponding single cell 10 of an electric double layer capacitor in parallel, and each of the resistors 18 is connected to the corresponding Zener diodes 16 in series, so that it is possible to prevent the excessive charge due to the difference in electrostatic capacity and internal resistance by setting the Zener voltage VZ at a value near the rated voltage of the corresponding single cells 10. Therefore, it is possible to prevent the excessive charge that excessive bias voltage VB is impressed on the single cell, so that it is possible to prevent the life time from decreasing.

In addition, in a case where the bias voltage VB of the single cell 10 decreases to the Zener voltage VZ or in a case where the original bias voltage VB is less than the Zener voltage VZ, the operation of the Zener diode 16 is stopped, so that the discharge is not carried out. Therefore, it is possible to prevent useless discharge to maintain the charge stored in the single cell for a long time, so that it is possible to surely supply a large and stable current when a starter is driven and so forth.

Second, since the rated power of the Zener diode 16 is set at a value as small as possible, e.g., 1 W, it is possible to decrease the calorific value of the Zener diode 16 when the single cell 10 discharges to adjust the bias voltage VB. Therefore, it is not required to add a radiation mechanism, such as a cooling fin, to the Zener diode 16, so that it is possible to decrease the size of the whole circuit without increasing the number of parts and the manufacturing costs.

Third, since the resistance values of the respective resistors are set so that the discharge current I is as small as possible in view of the rated capacity of the Zener diode 16, it is possible to decrease the costs of the resistors 18. On the other hand, in a case where the discharge current I is set to be a large value, the bias voltage VB quickly decreases to the Zener voltage VZ, so that it is possible to decrease the time required to adjust the bias voltage. However, since the calorific value of the resistor 18 increases due to the increase of the discharge current I, an expensive resistor having a large rated power must be used as the resistor 18.

In addition, unless the single cell 10 deteriorates due to the excessive charge, there is no problem if it takes a lot of time to adjust the bias voltage. Therefore, unless there are problems on the decrease of life time of the single cell 10, it is possible to prevent the excessive charge at a low cost using the resistors 18 which require a long period of time to adjust the bias voltage. However, the present invention also includes a unit wherein the resistors 18 of relatively larger resistance value are used to decrease the period of time required to adjust the bias voltage.

Figure 5:
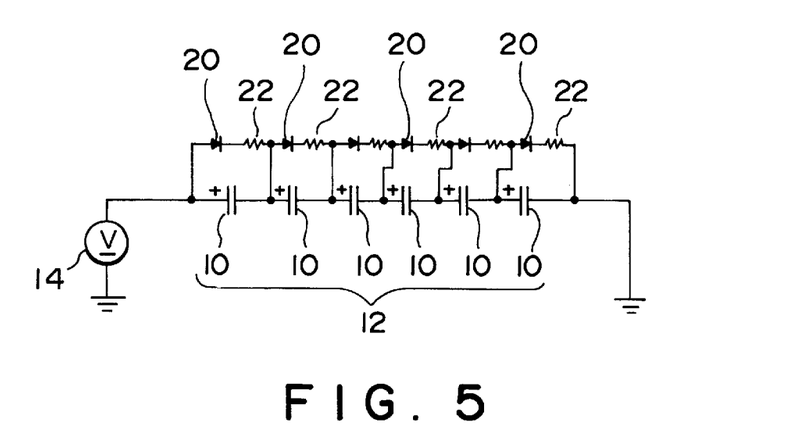
FIG. 5 is a schematic circuit diagram illustrating a main part of the second preferred embodiment of a power supply unit using electric double layer capacitors for an automotive vehicle according to the present invention.
Figure 6:
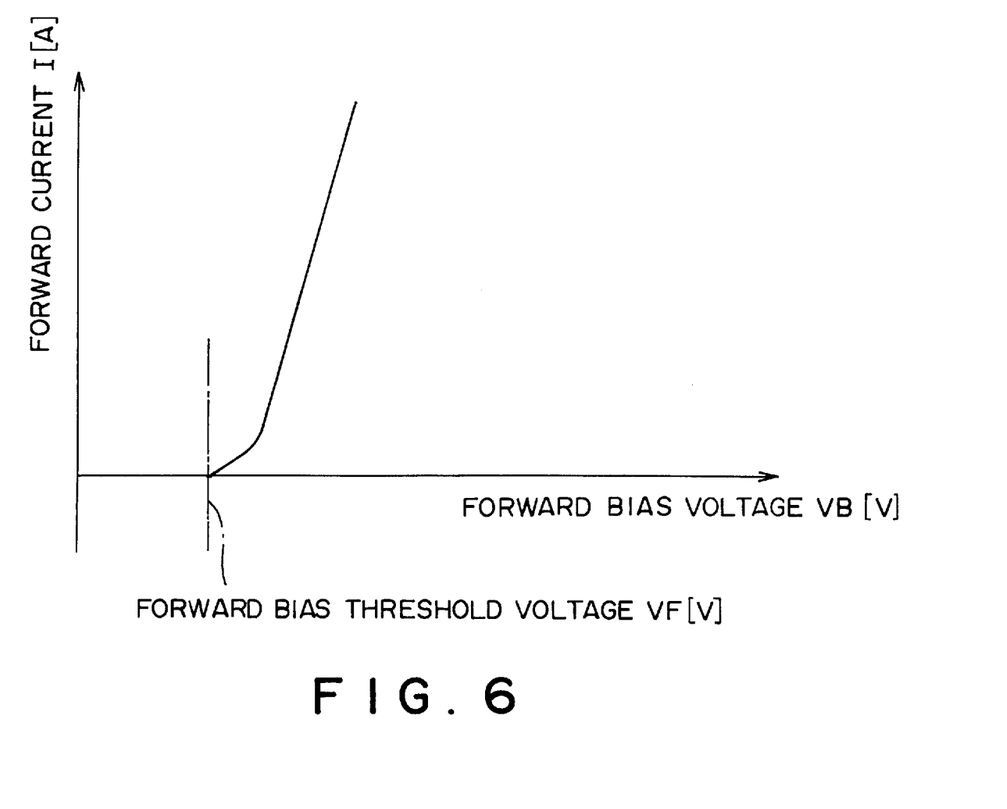
FIG. 6 is a graph explaining the electrical characteristic of a diode.

Referring to FIGS. 5 and 6, the second preferred embodiment of the present invention will be described below. Furthermore, in the undermentioned preferred embodiments, the same signs will be used for the same elements as those in the aforementioned first preferred embodiment, and the descriptions thereof will be omitted.

FIG. 5 shows a circuit of the second preferred embodiment of a power supply unit using electric double layer capacitors for an automotive vehicle. Also in this preferred embodiment, single cells 10 of an electric double layer capacitor are connected in series to form a capacitor pack 12 which is connected to an on-vehicle generator 14.

The feature of this preferred embodiment is that diodes 20 are used for the respective single cells 10 in place of the Zener diodes 16 in the aforementioned first preferred embodiment. A resistor 22 for limiting a discharge current I is connected to each of the diodes 22 in series. Furthermore, the rated power of each of the diodes 20 is preferably small. Each of the resistors 22 is also set so that the discharge current is small.

The anode terminal of each of the diodes 20 is connected to the positive electrode terminal of the corresponding single cell 10. As shown in FIG. 6, each of the diodes 20 allows the forward current to pass therethrough when the forward bias voltage VB exceeds a predetermined threshold voltage VF.

Therefore, each of the diodes 20 does not allow the discharge current I to pass therethrough unless the bias voltage VB reaches the forward bias threshold voltage VF, so that the discharge of each of the single cell 10 is not carried out. On the other hand, when the bias voltage VB decreases to the threshold voltage VF during the discharge of the single cells 10, the discharge is stopped. Furthermore, a slight current flows through each of the diodes 20 if the bias voltage VB is less than the forward bias threshold voltage VF. In the case of the Zener diodes 16, a slight current also flows therethrough when the bias voltage VB is less than the Zener voltage VZ. However, these current values are very small, so that it is possible to practically ignore these currents.

With this construction, in this preferred embodiment, the bias voltage VB is adjusted by the forward bias threshold voltage VF of the diode 20, so that it is possible to prevent the excessive charge caused by electrostatic capacity and internal resistance and to improve the life time, similar to the aforementioned first preferred embodiment. In addition, since the discharge is stopped immediately after the bias voltage VB decreases to the threshold voltage VF by the discharge, it is possible to prevent useless discharge to maintain the voltage for a long time, and to ensure an effective current supply if necessary, e.g., when the engine is started. In particular, since the forward bias threshold voltage VF of the diode 20 is generally less than the Zener voltage VZ (for example, from 0.3 to 0.4 V in the case of germanium, from 0.7 to 1.0 V in the case of silicon), this unit can be suitably used when the rated voltage of each of the single cells 10 is too low to utilize the Zener voltage VZ of the Zener diode 16.

Figure 7:
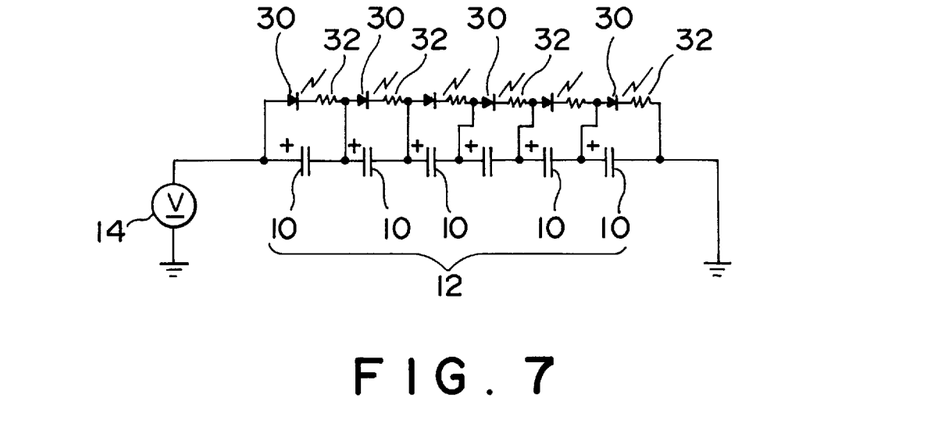
FIG. 7 is a schematic circuit diagram illustrating a main part of the third preferred embodiment of a power supply unit using electric double layer capacitors for an automotive vehicle according to the present invention.

Referring to FIG. 7, the third preferred embodiment of the present invention will be described below.

As shown in the schematic circuit diagram of FIG. 7, the third preferred embodiment of a power supply unit using electric double layer capacitors for an automotive vehicle, according to the present invention, comprises a capacitor pack 12, which is formed by connecting single cells 10 of an electric double layer capacitor in series and which is connected to an on-vehicle generator 14, similar to the aforementioned second preferred embodiment.

A light emitting diode 30 substituted for the diode 20 in the aforementioned second preferred embodiment, is connected to each of the single cells in parallel. Similar to the aforementioned preferred embodiment, a resistor 32 for limiting a discharge current I is connected to each of the light emitting diodes 30 in series. Furthermore, the rated power of each of the light emitting diodes 30 is preferably as small as possible. The resistor 32 is also set so that the discharge current I is small.

Similar to the diode 20 used in the aforementioned second preferred embodiment, the anode terminal of each of the light emitting diodes 30 is connected to the positive electrode terminal, so that each of the light emitting diodes 30 allows a forward current to pass therethrough to emit light in accordance with the magnitude of the forward current, i.e., the discharge current I, when the forward bias voltage VB exceeds a predetermined threshold voltage VF.

Therefore, until the bias voltage VB reaches the forward threshold voltage VF, the light emitting diode 30 does not allow the discharge current I to pass therethrough, so that the discharge of the single cell 10 is not carried out. In addition, when the bias voltage VB decreases to the threshold voltage VF, the discharge is stopped by the light emitting diode 30. Moreover, the luminance of the light emitting diode 30 decreases as the discharge current I decreases, and it increases as the discharge current I increases.

Thus, in this preferred embodiment, it is possible to suitably control the permission and stop of the discharge of each of the single cells 10, and to visually recognize the control state from the outside. That is, a light emitting diode 30 connected to a single cell 10 in parallel, which is in danger of excessive charge, emits light immediately after the adjustment of the bias voltage VB by the discharge is started. On the other hand, in a case where the bias voltage VB is a normal value or in a case where the bias voltage VB is low due to the lack of discharge, a light emitting diode 30 connected to a corresponding cell 10 in parallel does not emit light since the discharge current I does not flow. Therefore, it is possible to easily recognize the charged state of the single cell 10 from the outside on the basis of the presence of emission and luminance of the light emitting diode 30, without the need of any measuring instruments, so that it is possible to improve the maintenance. Furthermore, similar to the aforementioned preferred embodiments, it is possible to prevent the excessive charge due to electrostatic capacity and internal resistance, and to prevent the life time from decreasing.

Referring to the circuit diagram of FIG. 8, the fourth preferred embodiment of the present invention will be described below.

In this preferred embodiment of a power supply unit for an automotive vehicle according to the present invention, a plurality of single cells 10 of an electric double layer capacitor are connected in series to form a combination cell 40, and a plurality of combination cells 40 thus formed are connected in series to form a capacitor pack 42. For each of the combination cells 40, a circuit is formed by connecting a Zener diode 44, a light emitting diode 46 and a resistor 48 in series to each other and in parallel to the combination cell 40, and a plurality of circuits thus formed are connected in series to form the whole circuit.

In this preferred embodiment, since the Zener diode 44 and the light emitting diode 46 are connected in series, when a bias voltage VB is equal to or higher than a total value of a Zener voltage VZ and a forward bias threshold voltage VF (VB≧VZ+VF), a discharge current I flows to start the voltage adjustment. Furthermore, in this preferred embodiment, since the Zener diode 44 and the light emitting diode 46 are connected, in parallel, to the combination cell 40 formed by connecting, e.g., three single cells 10, the bias voltage VB is higher than that in the aforementioned preferred embodiments wherein the active element is connected to each of the single cells 10 in parallel.

In this preferred embodiment of such a construction, the adjustment of the bias voltage is carried out for each of the combination cells 40 formed by connecting the plurality of single cells 10 in series, not for each of the single cells 10. However, similar to the aforementioned preferred embodiments, it is possible to prevent the excessive charge of the combination cell 40 by the discharge permitted by the Zener diode 44 and the light emitting diode 46. In addition, it is possible to suppress useless discharge to conserve electric energy for a long time, and to enhance the practicability. Moreover, since the luminance of the light emitting diode 46 varies in accordance with the magnitude of the discharge current I, it is possible to easily visually recognize the charged state from the outside.

In addition, in this preferred embodiment, as mentioned above, it is possible to determine the discharge starting voltage as the total value of the Zener voltage VZ of the Zener diode 44 and the forward bias threshold voltage VF of the light emitting diode 46, and it is possible to accurately carry out the voltage adjustment for the excessive charge. Therefore, while it has been explained that one light emitting diode 46 is connected to the Zener diode 44 in series, the present invention should not be limited thereto. For example, two light emitting diodes 46 may be connected to the Zener diode 44. Alternatively, the light emitting diode 46 and a usual diode are connected to the Zener diode 44 to set the discharge starting voltage.

In addition, in this preferred embodiment, if it is set so that the temperature characteristic of the Zener diode 44 is coincident with the temperature characteristic of the light emitting diode 45, i.e., so that one characteristic variation due to temperature variation is canceled out by the other characteristic variation due to temperature variation, it is possible to accurately adjust the voltage for the excessive charge regardless of the temperature variation.

Figure 9:
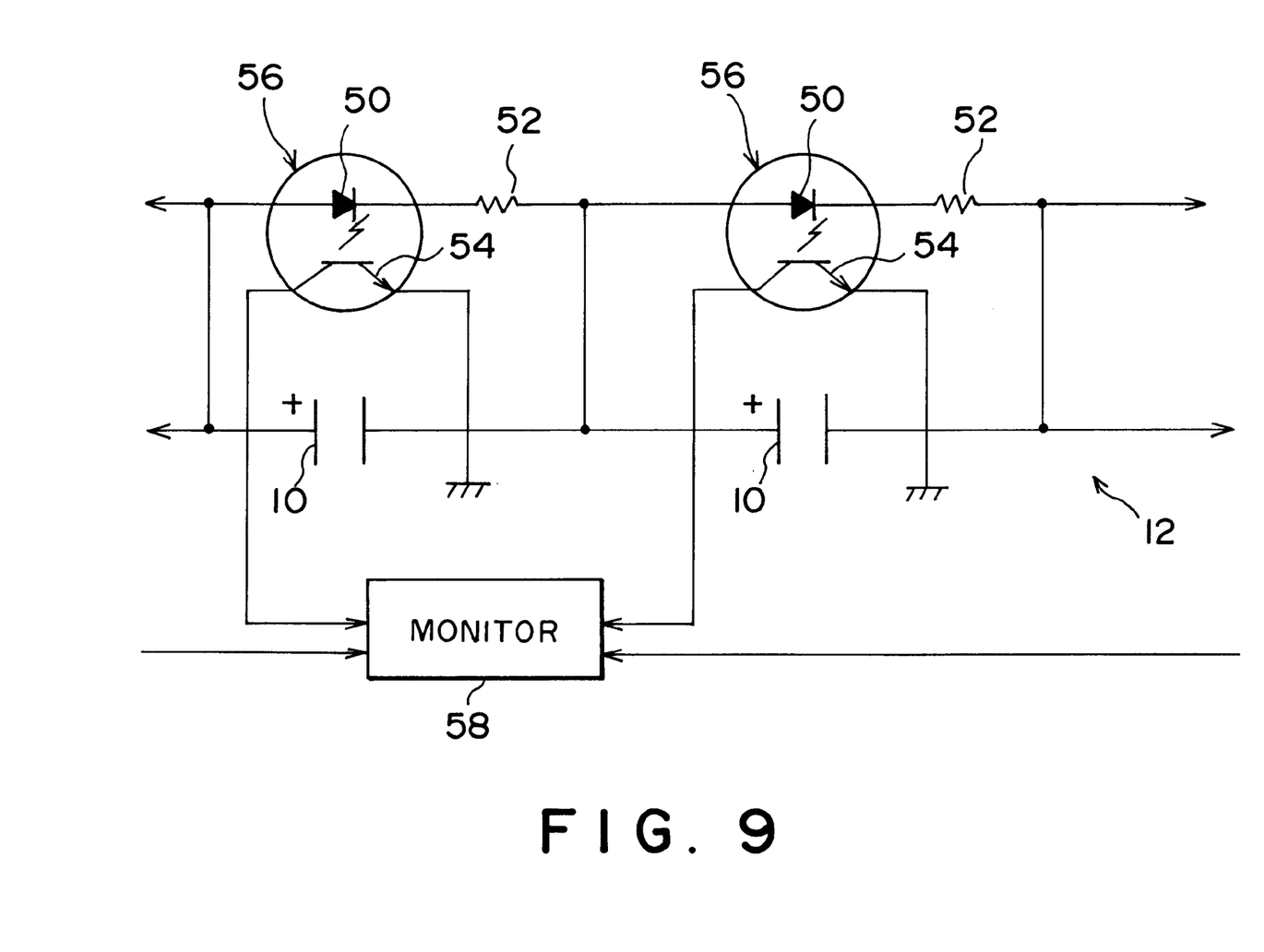
FIG. 9 is a schematic circuit diagram illustrating a main part of the fifth preferred embodiment of a power supply unit using electric double layer capacitors for an automotive vehicle according to the present invention.

Referring to FIG. 9, the fifth preferred embodiment of the present invention will be described below.

FIG. 9 is a circuit diagram illustrating an enlarged main portion of an electric circuit of a power supply unit for an automotive vehicle according to the present invention. In this preferred embodiment, single cells 10 of an electric double layer capacitor are connected in series to form a capacitor pack 12 which is connected to an on-vehicle generator 14 (not shown) similar to the aforementioned preferred embodiments.

A light emitting diode 50 is connected to each of the single cells 10 in parallel, and a resistor 52 for defining a discharge current I is connected to each of the light emitting diodes 50. A phototransistor 54 serving as a light receiving element, which receives light emitted by the light emitting diode 50 to convert the light into a voltage signal, is provided near the light emitting diode 50.

That is, the light emitting diode 50 and the phototransistor 54 form a photocoupler 56 as a whole. The collector terminal of each of the phototransistors 54 is connected to a monitor 58. The monitor 58 displays the voltage adjusted states of the respective single cells 10 on the basis of the voltage signals from the phototransistors 54. For example, the monitor 56 comprises a display section such as a LED display, a LED lamp and a meter, an input interface circuit and so forth.

In this preferred embodiment, the light emitted state of the light emitting diode 50 is detected by means of the phototransistor while being electrically insulated, and the detected results are output to the monitor 58, so that it is possible to confirm the voltage adjusted state of the single cell 10 by means of the monitor 58. Furthermore, the light emitting diode 50 serving as a charging voltage detecting section is electrically insulated from the monitor 58 serving as a luminous-state detecting section. Therefore, it is not required to provide any special elements such as an insulating rubber, so that it is possible to safely and easily monitor the charged states of the respective single cells 10 without being in danger of an electric shock.

This preferred embodiment also has the same advantageous effects as those of the aforementioned preferred embodiments, since the discharge is stopped when the bias voltage VB decreases to the forward bias threshold voltage VF of the light emitting diode 50.

Figure 8:
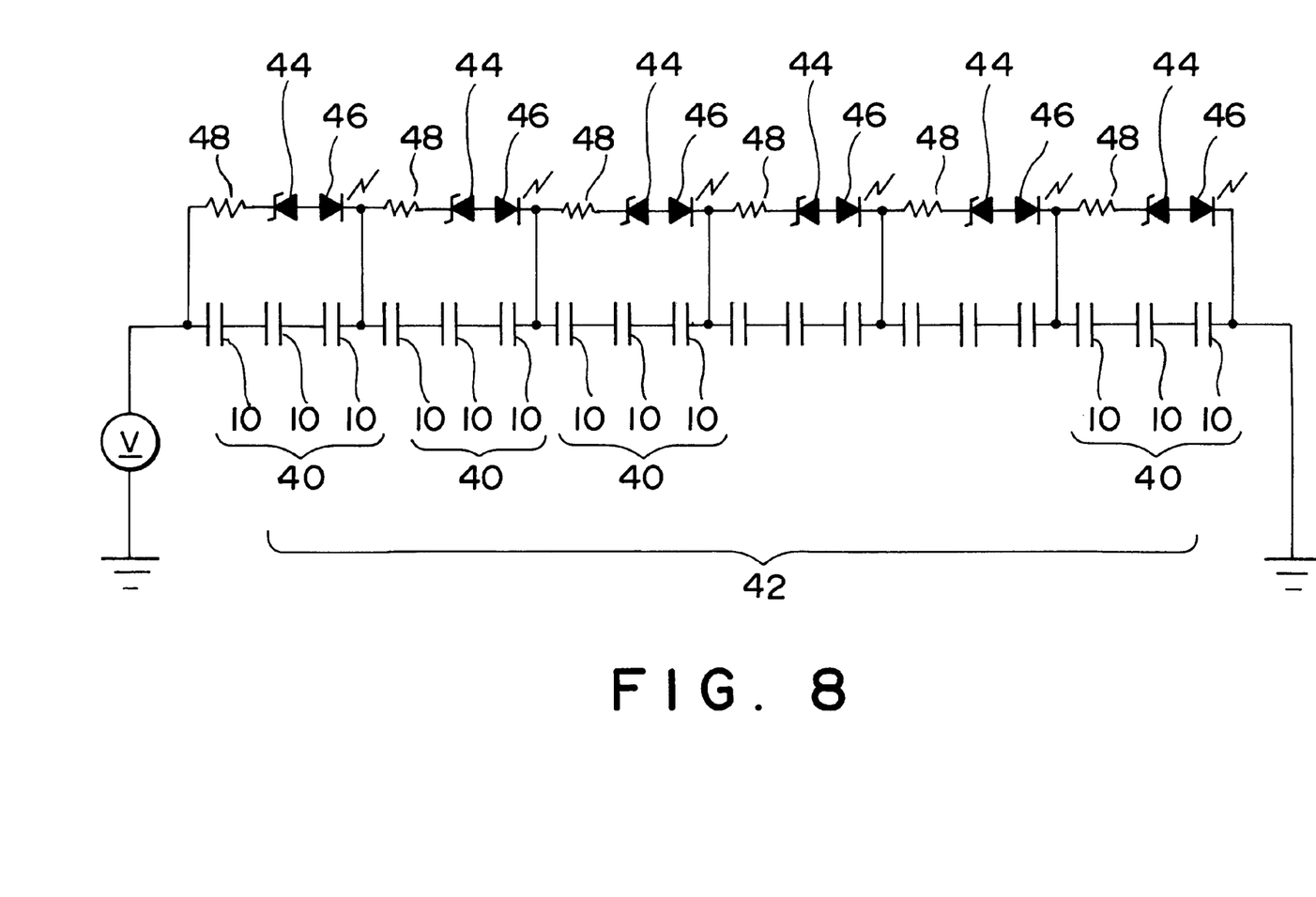
FIG. 8 is a schematic circuit diagram illustrating a main part of the fourth preferred embodiment of a power supply unit using electric double layer capacitors for an automotive vehicle according to the present invention.

In particular, similar to the fourth preferred embodiment described referring to FIG. 8, in a case where a plurality of single cells 10 are connected in series to form a combination cell 40 to determine whether the excessive charge occurs for each of the combination cells 40, it is effective to monitor using the insulation of the photocoupler 56, since the terminal-to-terminal voltage of the combination cell 40, i.e., the bias voltage VB, increases by the single cells 10 connected in series.

Figure 10:
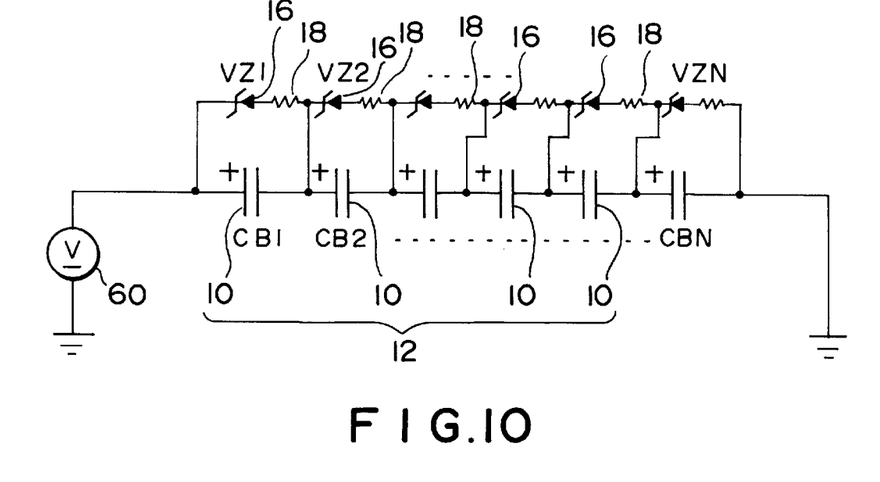
FIG. 10 is a schematic circuit diagram illustrating a main part of the sixth preferred embodiment of a power supply unit using electric double layer capacitors for an automotive vehicle according to the present invention.

Referring to FIG. 10, the sixth preferred embodiment of the present invention will be described below.

This preferred embodiment is characterized by the setting of a voltage value when each of single cells 10 is charged. That is, FIG. 10 is a circuit diagram of this preferred embodiment of a power supply unit for an automotive vehicle according to the present invention, and this electric circuit has basically the same construction as that of the first preferred embodiment shown in FIG. 3.

However, in this preferred embodiment, the charging voltage output from an on-vehicle generator 60 is set so as to exceed the rated voltage of the single cell 10 and to be equal to or higher than the total Zener voltage VZ of Zener diodes 16. That is, assuming that the Zener voltages VZ of the Zener diodes 16 are VZ1, VZ2, . . . VZN, the on-vehicle generator 60 serving as a DC constant-voltage source mounted on the vehicle outputs a voltage equal to or higher than the total Zener voltage VZT (=VZ1+VZ2+ . . . +VZN).

Thus, in a case where the bias voltage VB2 of a single cell CB2 of the single cells (CB) 10 in FIG. 8 is higher than the Zener voltage VZ2, a discharge current flows through the Zener diode 16 connected to the single cell CB2 in parallel. Since the on-vehicle generator 60 is a constant-voltage source, it supplies a current corresponding to the discharge current. The current supplied from the on-vehicle generator 60 is supplied to all the single cells CB1, CB2, . . . , CBN connected in series. As a result, single cells having a lower bias voltage than that of the single cell CB2 are charged by the current from the on-vehicle generator 60, so that the bias voltages thereof increase.

Therefore, the voltages of excessively charged single cells, to which a bias equal to or higher than the rated voltage (Zener voltage VZ) is applied, are decreased by discharge, and the voltages of insufficiently charged single cells, to which a bias less than the rated voltage, are increased by charge. Thus, it is possible to balance the charging voltages of the single cells 10 even if the engine is operated.

That is, in the aforementioned preferred embodiments, the excessively charged single cells 10 are discharged during the voltage output from the on-vehicle generator 14 is stopped due to the stop of the engine, so that it is possible to balance the voltages of the single cells to prepare to carry out a new charge by the restart of the engine.

In this case, the voltages of the excessively charged single cells 10 are decreased to the Zener voltage VZ by discharge, and the discharge current I is supplied to the other insufficiently charged single cells 10. However, in a case where the number of the insufficiently charged single cells 10 are great or the amount of insufficiency (the difference from the Zener voltage VZ) is great, the voltages of the insufficiently charged single cells 10 may not be increased to the Zener voltage VZ.

On the other hand, in this preferred embodiment, the charged voltage output from the on-vehicle generator 60 serving as a constant-voltage source during the operation of the engine is set at a value equal to or higher than the total Zener diode VZ of the Zener diodes 16, each of which is connected to each of the singles cells 10 in parallel. Therefore, it is possible to increase the bias voltages of the insufficiently charged single cells 10 while decreasing the bias voltages of the excessively charged single cells 10, so that it is possible to effectively recover and maintain the whole balance.

Figure 11:
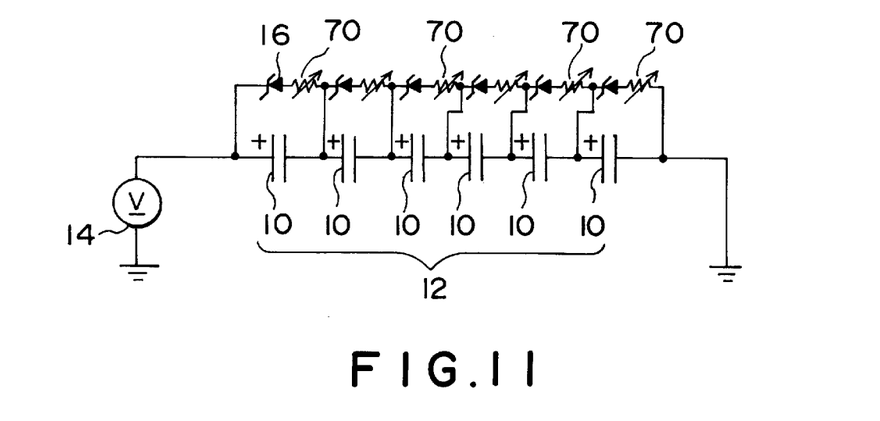
FIG. 11 is a schematic circuit diagram illustrating a main part of the seventh preferred embodiment of a power supply unit using electric double layer capacitors for an automotive vehicle according to the present invention.

Referring to FIG. 11, the seventh preferred embodiment of the present invention will be described below.

As shown in the circuit diagram of FIG. 11, this preferred embodiment of a power supply unit for an automotive vehicle is characterized in that variable resistors 70 are substituted for the resistors 18 in the aforementioned first preferred embodiment. Each of these variable resistors 70 can variably adjust the resistance value thereof, e.g., by rotating a trimmer provided thereon.

This preferred embodiment has the same advantageous effects as those in the aforementioned first preferred embodiment. In addition, since the resistance value is variable to define the discharge current I, it is possible to set the resistance at a desired value in accordance with the dispersions in electrostatic capacity of the single cells 10. Moreover, even if the characteristic of the single cell 10 varies with time, it is possible to limit the discharge current I in accordance with the characteristic variation, so that it is possible to improve the usability and reliability.

Figure 12:
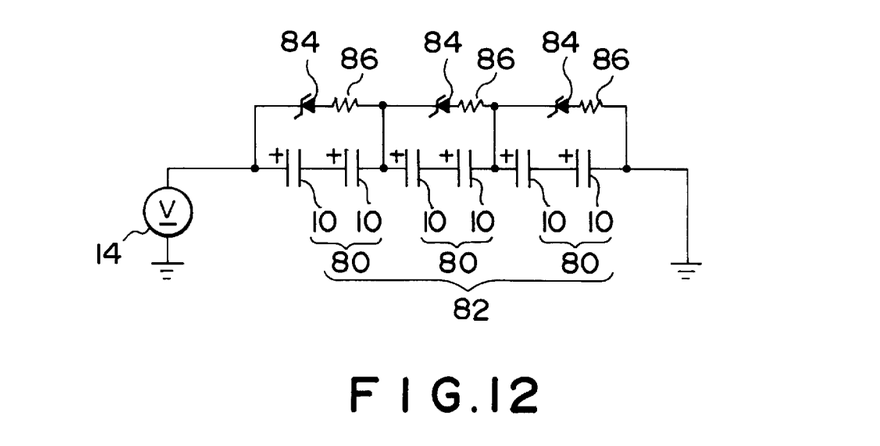
FIG. 12 is a schematic circuit diagram illustrating a main part of the eighth preferred embodiment of a power supply unit using electric double layer capacitors for an automotive vehicle according to the present invention.

Referring to FIG. 12, the eighth preferred embodiment of the present invention will be described below.

In this preferred embodiment of a power supply unit for an automotive vehicle according to the present invention, as shown in FIG. 12, a plurality of single cells 10 are connected in series to form a combination cell 80, and a plurality of combination cells 80 thus formed are connected in series to form a capacitor pack 82. A Zener diode 84 is connected to each of the combination cells 80 in parallel, and a resistor 86 is connected to each of the Zener diodes 84 in series. With this construction, according to this preferred embodiment, it is possible to set the voltage for preventing the excessive charge for each of the combination cells 80.

Furthermore, the present invention should not be limited to the aforementioned preferred embodiments, but the present invention can be embodied in various ways without departing from the principle of the invention. For example, the described constructions can be suitably combined, and the number of the single cells can be changed. And, importantly, each of the circuits described in FIGS. 3 through 12 can be applied to a lead battery pack for an electric vehicle. The same explanation can be made except for replacing capacitor cells with lead battery cells.

While the presently preferred embodiments of the present invention have been shown and described, it is to be understood that this disclosure is for the purpose of illustration and that various changes and modification may be made without departing from the scope of the invention as set forth in the appended claims.

What is claimed is:

1. A power supply unit electrically connected to a generator for generating and storing electric energy and for providing said electric energy to various electrical loads therefrom, said power supply unit comprising:
    a plurality of electric double layer capacitors directly connected to said generator in series and to a ground, said capacitors for storing said electrical energy as an electric current;
    a series combination connected in parallel to each of said capacitors for controlling charging voltage of said capacitors, comprising:
        a Zener diode for allowing said electric current to flow a bias current in a reverse direction when a bias voltage is greater than a predetermined Zener voltage,
        a resistor connected in series to said Zener diode for restricting discharge of electric current from said Zener diode and thereby avoiding overcharge of said double layer capacitors.

2. The power supply unit according to claim 1, wherein a charging voltage is greater than said predetermined Zener voltage and less than a rated voltage of the capacitor.

3. The power supply unit according to claim 1, wherein said series combination further comprises a diode connected in series to said resistor and said Zener diode such that a forward bias voltage is impressed thereon, said diode having a forward bias threshold value, thereby increasing the charging voltage to the sum of the Zener voltage plus said threshold voltage.

4. The power supply unit according to claim 1 wherein: said resistor is a variable resistor.

5. The power supply unit according to claim 1, wherein: the charging voltage is greater than a rated voltage of the capacitor and greater than a sum of said predetermined Zener voltages.

6. A power supply unit electrically connected to a generator for storing electric energy and for providing said electric energy to various electrical loads therefrom, comprising:
    a plurality of electric double layer capacitors directly connected to said generator in series and to a ground for storing said electric energy as an electric current;
    a series combination connected in parallel to each of said capacitors for controlling charging voltage of said capacitors comprising:
        a diode for allowing said electric current to flow a bias current in a forward direction when a bias voltage is greater than a threshold voltage; and
        a resistor, connected in series to said diode so as to minimize the discharge of electric current from said diode to avoid an overcharge of said electric double layer capacitors.

7. The power supply unit according to claim 6 wherein: the charging voltage is lower than a rated voltage of said capacitor and greater than said threshold voltage.

8. The power supply unit according to claim 6 wherein: said resistor is a variable resistor.

9. The power supply unit according to claim 6 wherein: said diode is a light emitting diode.

10. The power supply unit according to claim 9 further comprising:
    a phototransistor connected to said light emitting diode for converting a light signal to a voltage signal; and
    a monitor responsive to said voltage signal for displaying a voltage adjusted condition of said light emitting diode.

11. A power supply unit electrically connected to a generator for storing electric energy and for providing said electric energy to various electrical loads therefrom comprising:
    a capacitor combination of a plurality of electric double layer capacitors directly connected to said generator in series and to a ground for storing said electric energy as an electric current;
    a series combination connected in parallel to said capacitor combination for controlling charging voltage of said capacitors, comprising:
        a light emitting diode for allowing said electric current to flow a bias current in a forward direction when a bias voltage is larger than a threshold voltage;
        a Zener diode directly connected to said light emitting diode in series for preventing an overcharge of said combination by discharging thereof; and
        a resistor connected in series with said Zener diode and said light emitting diode for restricting the discharge of said electric current from said light emitting diode so as to avoid an overcharge of said electric double layer capacitors.

12. The power supply unit according to claim 11, wherein: said charging voltage is below rated voltage of said electric double layer capacitors and greater than a sum of said Zener voltage and said threshold voltage value so as to balance said charging voltage of each of said electric double layer capacitors.

13. The power supply unit according to claim 11, wherein: said resistor is a variable resistor.

* * * * *